US006975756B1

(12) United States Patent
Slabaugh et al.

(10) Patent No.: US 6,975,756 B1
(45) Date of Patent: Dec. 13, 2005

(54) IMAGE-BASED PHOTO HULLS

(75) Inventors: Gregory G. Slabaugh, Atlanta, GA (US); Ronald W. Schafer, Atlanta, GA (US); Mathieu C. Hans, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 600 days.

(21) Appl. No.: 10/095,661

(22) Filed: Mar. 12, 2002

(51) Int. Cl.$^7$ ............................................. G06K 9/00
(52) U.S. Cl. ..................... 382/154; 359/470; 345/427; 345/653; 345/679; 702/153; 715/757
(58) Field of Search ............................... 382/100, 103, 382/107, 108, 154, 236, 287, 291; 356/12; 359/462, 470; 345/424, 427, 653; 702/153; 715/757, 782

(56) References Cited

U.S. PATENT DOCUMENTS

| | | | |
|---|---|---|---|
| 6,192,145 B1 * | 2/2001 | Anandan et al. ............ | 382/154 |
| 6,642,924 B1 * | 11/2003 | Kang et al. ................. | 345/427 |
| 6,792,140 B2 * | 9/2004 | Matusik et al. ............. | 382/154 |
| 2004/0104935 A1 * | 6/2004 | Williamson et al. ........ | 345/757 |

OTHER PUBLICATIONS

Wada et al. ("Homography based parallel volume intersection: toward real-time volume reconstruction using active camera"; Wada, T.; Computer Architectures for Machine Perception, 2000. Proceedings. Fifth IEEE International Workshop on, Sep. 11-13, 2000;).*

Kutulakos et al. ("A theory of shape by space carving"; Kutulakos, K.N.; Seitz, S.M.; Computer Vision, 1999. The Proceedings of the Seventh IEEE International Conference on , vol. 1 , Sep. 20-27, 1999 pp.: 307-314 vol. 1).*

Inferring the shape of the real object from the object reconstructed by volume intersection Laurentini, A.; Computer Vision and Pattern Recognition, 1993. Proceedings CVPR '93., 1993 IEEE Computer Society Conference on , Jun. 15-17, 1993 pp.: 280-285.*

How far 3D shapes can be understood from 2D silhouettes Laurentini, A.; Pattern Analysis and Machine Intelligence, IEEE Transactions on , vol. 17 , Issue: 2, Feb. 1995 pp.: 188-195.*

Culbertson et al. (Presented at Vision Algorithms: Theory and Practice, held in conjunction with the IEEE International Conference on Computer Vision, Sep. 21-22, 1999, Corfu, Greece. Copyright 1999 Hewlett-Packard Company).*

P. Debevec, C. Taylor, and J. Malik, "Modeling and rendering architecture from photographs: A hybrid geometry- and image-based appraoch," in SIGGRAPH, 1996, pp. 11 20.

Andrew C. Prock and Charles R. Dyer, "Towards real-time voxel coloring," in Image Understanding Workshop, 1998, pp. 315 321.

(Continued)

*Primary Examiner*—Samir Ahmed
*Assistant Examiner*—Anand Bhatnagar

(57) ABSTRACT

The invention features an improved, photo hull based method of generating a three-dimensional representation of a visual scene based upon a set of multi-view reference images. In one aspect, a visual hull containing the visual scene is computed. Visibility of points on the computed visual hull with respect to each reference image is computed. Photo-consistency of points on the computed visual hull along rays back-projected from a desired view is computed based upon reference images having visibility of the points. A photo hull containing the visual scene is generated by stepping along each back-projected ray. The photo-consistent points visible in the desired view are colored using color information contained in reference images having visibility of the photo-consistent points.

45 Claims, 8 Drawing Sheets

OTHER PUBLICATIONS

P. Narayanan, P. Rander, and T. Kanade, "Constructing virtual worlds using dense stereo," in ICCV, 1998, pp. 3 10.

S. Moezzi, L. C. Tai, and P. Gerard, "Virtual view generation for 3d digital video," IEEE Multimedia, vol. 4, No. 1, pp. 1826, 1997.

S. Vedula, S. Baxter, S. Seitz, and T. Kanade, "Shape and motion carving in 6d," in CVPR, 2000, vol. 2, pp. 592 598.

R. Carceroni and K. Kutulakos, "Multi-view scene capture by surfel sampling: From video streams to non-rigid motion, shape, and refbctance," in ICCV, 2001, vol. 2, pp. 6057.

W. Matusik, C. Buehler, R. Raskar, S. J. Gortler, and L. McMillan, Image-based visual hulls, in SIGGRAPH, 2000, pp. 369374.

A. Laurentini, "The visual hull concept for silhouette-based image understanding," IEEE Transactions on Pattern Analysis and Machine Intelligence, vol. 16, No. 2, pp. 150 162, 1994.

R. Szeliski, "Rapid octree construction from image sequences," CVGIP: Image Understanding, vol. 58, No. 1, pp. 23 32, 1993.

K. Kutulakos and S. Seitz, "A theory of shape by space carving," Int. J. Computer Vision, vol. 38, No. 3, pp. 199 218, 2000.

Steven M. Seitz and Charles R. Dyer, "Photorealistic scene reconstruction by voxel coloring," Int. J. Computer Vision, vol. 35, No. 2, pp. 151 173, 1999.

W. B. Culbertson, T. Malzbender, and G. Slabaugh, "Generalized voxel coloring," in ICCV Workshop, Vision Algorithms Theory and Practice. 1999, pp. 100 115, SpringerVerlag LNCS 1883.

P. Eisert, E. Steinbach, and B. Girod, Multi-hypothesis, volumetric reconstruction of 3-d objects from multiple calibrated camera views, in ICASSP, 1999, vol. 6, pp. 35093512.

A. Broadhurst, T. W. Drummond, and R. Cipolla, "A probabilistic framework for space carving," in ICCV, 2001, vol. 1, pp. 388393.

C. R. Dyer, "Volumetric scene reconstruction from multiple views," in Foundations of Image Understanding, L. S. Davis, Ed., pp. 469-489. Kluwer, 2001.

G. Slabaugh, W. B. Culbertson, T. Malzbender, and R. Schafer, "A survey of volumetric scene reconstruction methods from photographs," in Volume Graphics 2001, Proc. of Joint IEEE TCVG and Eurographics Workshop, K. Mueller and A. Kaufman, Eds. 2001, pp. 81 100, Springer Computer Science.

O. Faugeras and R. Keriven, Variational principles, surface evolution, pde's, level set methods and the stereo problem, IEEE Transactions on Image Processing, vol. 7, No. 3, pp. 336344, 1998.

J. Shade, S. Gortler, L. He, and R. Szeliski, "Layered depth images," in SIGGRAPH, 1998, pp. 231242.

* cited by examiner

US 6,975,756 B1

IMAGE-BASED PHOTO HULLS

TECHNICAL FIELD

This invention relates to systems and methods of generating three-dimensional representations of a visual scene.

BACKGROUND

The task of generating a photo-realistic 3D representation of a visual scene is an important and challenging problem. Debevec et al. demonstrated in their Campanile movie that it is possible, using a user-assisted 3D modeling program and a handful of photos of a college campus, to produce a digital model of the scene that, when rendered, yields images of stunning photorealism from novel viewpoints (see, e.g., P. Debevec et al., "Modeling and rendering architecture from photographs: A hybrid geometry- and image-based approach," SIGGRAPH, pp. 11–20 (1996)). Since this work, there has been much interest in producing results of similar quality using methods that are automatic and work on scenes composed of surfaces of arbitrary geometry.

A standard approach to reconstructing a 3D object using multi-view images is to compute the visual hull. For each reference view, a silhouette is generated by segmenting the photograph into foreground and background. Foreground pixels correspond to points to which the 3D object projects. Everything else is background. Each silhouette constrains the 3D space in which the object is located. If a 3D point projects to background in any of the images, it cannot be part of the 3D object being reconstructed. After eliminating such points, the surface of the region of space that remains is the visual hull. The visual hull is guaranteed to contain the 3D object. Using more reference views produces a visual hull that more closely resembles the geometric shape of the true 3D object. However, even with an infinite number of photographs, the visual hull cannot model surface concavities that are not apparent in the silhouettes.

A variety of methods have been developed to compute the visual hull of a scene. Perhaps the most common approach is to operate in a volumetric framework. A volume that contains the scene being reconstructed is defined. The volume is then tessellated into voxels. All the voxels that project to solely background pixels in one or more reference views are removed (carved). The remaining voxels represent the visual hull and its interior. Such an method can adopt a multi-resolution strategy to achieve faster results.

Recently, researchers have become interested in reconstructing time-varying scenes. Unfortunately, most standard approaches to the 3D scene reconstruction problem such as multi-baseline stereo, structure from motion, and shape from shading are too slow for real-time application on current computer hardware. When working with multi-view video data, most techniques perform the 3D reconstruction offline after the images have been acquired. Once the reconstruction is complete, it is rendered in real-time.

A notable exception is the Image-Based Visual Hulls (IBVH) method that was developed at MIT by Matusik et al. (see, e.g., W. Matusik et al., "Image-based visual hulls," SIGGRAPH, pp. 369–374 (2000)). This method is efficient enough to reconstruct and render views of the scene in real-time. The key to this method's efficiency is the use of epipolar geometry for computing the geometry and visibility of the scene. By taking advantage of epipolar relationships, all of the steps of the method function in the image space of the photographs (also called "reference views") taken of the scene.

Referring to FIG. 1, one of the unique properties of the IBVH method is that the geometry it reconstructs is view-dependent. A user moves a virtual camera about the scene. For each virtual camera placement (also called a desired view 10), the IBVH method computes the extent that back-projected rays from the center of projection $C_d$ intersect the visual hull 12 in 3D space. Thus, the representation of the geometry is specified for the desired view, and changes as the user moves the virtual camera.

Consider an individual ray 14, as shown in FIG. 2. The ray is back-projected from the desired view's center of projection $C_d$, through a pixel 16 in the image plane, and into 3D space. This ray projects to an epipolar line 18, 20 in each reference view 22, 24. The IBVH method determines the 2D intervals where the epipolar lines 18, 20 crosses the silhouette 25, 27. These 2D intervals are then "lifted" back onto the 3D ray 14 using a simple projective transformation. The intervals along the 3D ray from all reference views 22, 24 are intersected. The resultant set of intervals describes where the ray pierces the visual hull 12. These are called "visual hull intervals" herein. In FIG. 2, one visual hull interval 26 is found along the back-projected ray. Once this procedure has been performed on all rays back-projected from the desired view 10, the reconstruction of the view-dependent geometry of the visual hull 12 is complete.

In order to color a point on the visual hull, it is necessary to determine which cameras have an unoccluded view of the point. Thus, visibility must be computed before texture-mapping the reconstructed geometry. In the following discussion, a point in 3D space is represented in homogeneous coordinates by a boldface capital letter, such as P, where $P=[x\ y\ z\ w]^T$. The projection of this point into an image is a 2D point represented in homogeneous coordinates by a boldface lowercase letter, such as $p=[x\ y\ w]^T$. To convert a homogeneous image point to inhomogeneous coordinates (i.e. pixel coordinates), one simply divides p by the w component. Thus, a pixel will have coordinates $p=[x/w\ y/w\ 1]^T$.

Referring to FIG. 3A, at a pixel p in the desired view, the first point (if any) along the first visual hull interval 28 indicates a point P in 3D space that projects to p and is visible in the desired view. To compute visibility, for each reference view we need to determine if P is visible. P must be visible in the reference view if the line segment $\overline{PC_r}$ between P and the reference view's center of projection $C_r$ does not intersect any visual hull geometry.

As shown in FIG. 3B, the layered depth image representation of the visual hull makes this easy to determine. In the desired view, $\overline{PC_r}$ projects to an epipolar line segment $\overline{pe}$, where e is the epipole, found by projecting $C_r$ into the desired view. For each pixel along $\overline{pe}$, the visual hull intervals can be checked to see if they contain geometry that intersects $\overline{PC_r}$. If an intersection occurs, point P is not visible in the reference view, and no more pixels along $\overline{pe}$ need be evaluated. Otherwise, one continues evaluating pixels along $\overline{pe}$, until there are no more pixels to evaluate. If no visual hull interval has intersected $\overline{PC_r}$, then the point P is visible in the reference view. The above-mentioned IBVH paper by Matusik et al. also discusses discretization issues in computing visibility using this approach, as well as occlusion-compatible orderings to improve its efficiency.

Referring to FIG. 4, once visibility has been computed, one can color the visual hull using the reference views. The IBVH paper employs view-dependent texture mapping, which retains view-dependent effects present in the photos, and works well with the inaccurate geometry of the visual hull. To color a point p in the desired view, the closest point P on the hull is found. Then, for each reference view that has visibility of P, the angle between $\overline{PC_d}$ and $\overline{PC_r}$ is found. The reference view with the smallest angle is chosen to color the visual hull. This is the reference view that has the "best" view of P for the virtual camera's location. For example, in FIG. 4, reference view 2 would be chosen since $\theta_1 > \theta_2$.

While the IBVH method is exceptionally efficient, the geometry it reconstructs is not very accurate. This is because the IBVH method only reconstructs the visual hull of the scene. The visual hull is a conservative volume that contains the scene surfaces being reconstructed. When photographed by only a few cameras, the scene's visual hull is much larger than the true scene. Even if photographed by an infinite number of cameras, many scenes with concavities will not be modeled correctly by a visual hull. One can only partially compensate for such geometric inaccuracies by view-dependent texture-mapping (VDTM), as done in the IBVH approach.

As shown in FIGS. 5A and 5B, however, artifacts resulting from the inaccurate geometry of the visual hull still are apparent in new synthesized views of the scene. In FIGS. 5A and 5B, a person's head photographed from four viewpoints is reconstructed. A new view of the scene, placed half-way between two reference views, is rendered from the reconstruction. The top row shows the visual hull reconstruction. At this viewpoint, the right side of the face is texture-mapped with one reference image, while the left side of the face is texture-mapped with another. Due to the geometric inaccuracy of the visual hull, there is a salient seam along the face where there is a transition between the two images used to texture-map the surface.

SUMMARY

The invention features an improved method of generating a three-dimensional representation of a visual scene from a set of multi-view reference images based upon photo hulls. The photo hull is a volume that contains the scene surfaces being reconstructed. However, it is a tighter fit to the true scene geometry than the corresponding visual hull. New views synthesized using the more accurate geometry of the photo hull have improved photorealism relative to views synthesized using the corresponding visual hull.

In one aspect of the invention, a visual hull containing the visual scene is computed. Visibility of points on the computed visual hull with respect to each reference image is computed. Photo-consistency of points on the computed visual hull along rays back-projected from a desired view is computed based upon reference images having visibility of the points. A photo hull containing the visual scene is generated by stepping along each back-projected ray. The photo-consistent points visible in the desired view are colored using color information contained in reference images having visibility of the photo-consistent points.

Embodiments in accordance with this aspect of the invention may include one or more of the following features.

The step of computing a visual hull preferably comprises determining a set of visual hull intervals for each of a set of rays back-projected from a center of projection of the desired view.

The step of computing visibility for a reference image preferably comprises determining whether the computed visual hull intersects line segments between a reference image center of projection and points on the visual hull projecting to points in the desired view.

In some embodiments, the step of determining photo-consistency comprises projecting 3D points to respective image-space points in the reference images having visibility of the projected points, and matching color distributions of sets of reference image pixels neighboring the respective image-space points. In these embodiments, the step of determining photo-consistency may comprise comparing a computed measure of color variability in the sets of reference image pixels against a threshold. The threshold may comprise a non-variable parameter. The threshold may further comprise a variable parameter that adapts to color variability in the sets of reference image pixels. The variable parameter may comprise a measure of average color variability in the sets of reference image pixels. The step of determining photo-consistency preferably comprises stepping along an epipolar line in each reference view corresponding to a photo-inconsistent ray from a center of projection of the desired view through a point in the desired view. The step of determining photo-consistency may comprise projecting points along the ray to corresponding points in each reference image. The step of projecting points may comprise multiplying reference image projection matrices with points along the ray. The step of projecting points may comprise incrementally updating homogeneous positions of points along epipolar lines. Point positions may be incrementally updated based upon precomputed step sizes for each ray. In some embodiments, point positions may be incrementally updated based upon step sizes adaptively computed for each ray. For example, step sizes may be adaptively computed based upon a measure of photo-consistency of each ray. Visibility may be re-computed after stepping along an inconsistent ray. For example, visibility may be re-computed after a first step is taken along each photo-inconsistent ray. The step of stepping along a photo-inconsistent ray may be discontinued when the number of steps taken along the ray exceeds a measure of average steps taken along neighboring rays.

The step of generating the photo hull may comprise terminating the stepping along a given back-projected ray when a photo-consistent point along the given back-projected ray is found.

In some embodiments, the photo hull is generated after a number of rays determined to be photo-consistent exceeds a threshold value.

The steps may be performed with respect to a sampled sub-set of pixels in the desired view.

The step of coloring the photo hull may comprise view-dependent texture mapping of the photo-consistent points using the reference images that have visibility of the photo-consistent points that are visible in the desired view.

In another aspect, the invention features a computer program operable to implement the above-described method of generating a three-dimensional representation of a visual scene.

Other features and advantages of the invention will become apparent from the following description, including the drawings and the claims.

DETAILED DESCRIPTION

Figure 1:
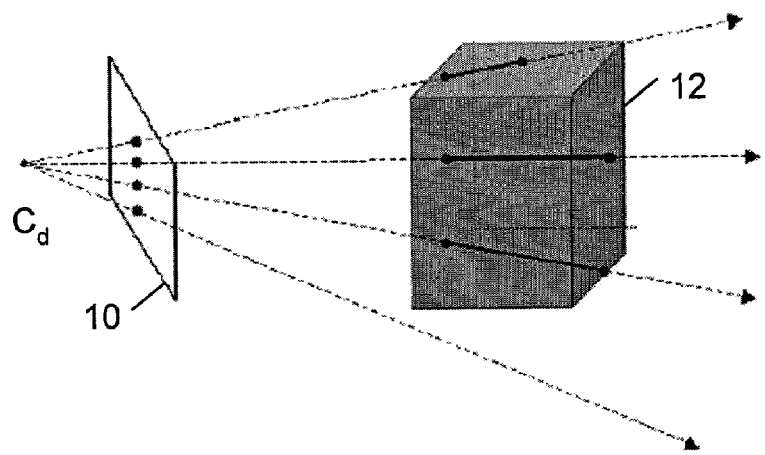
FIG. 1 is a diagrammatic representation of a view-dependent geometry reconstructed by the method of FIG. 1.
Figure 2:
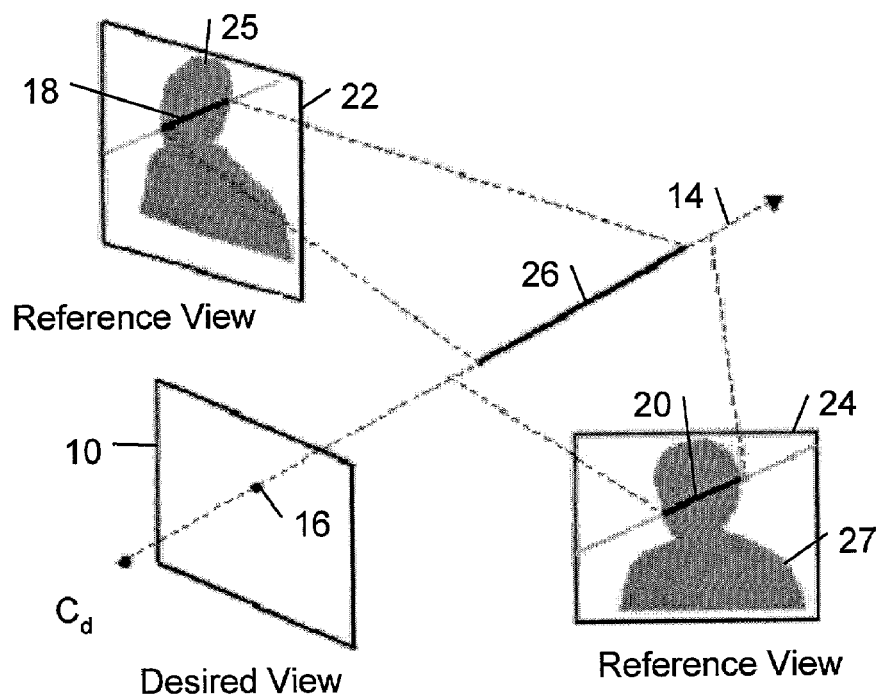
FIG. 2 is a diagrammatic representation of a method of determining visual hull intervals of a back-projected ray.
Figure 3A:
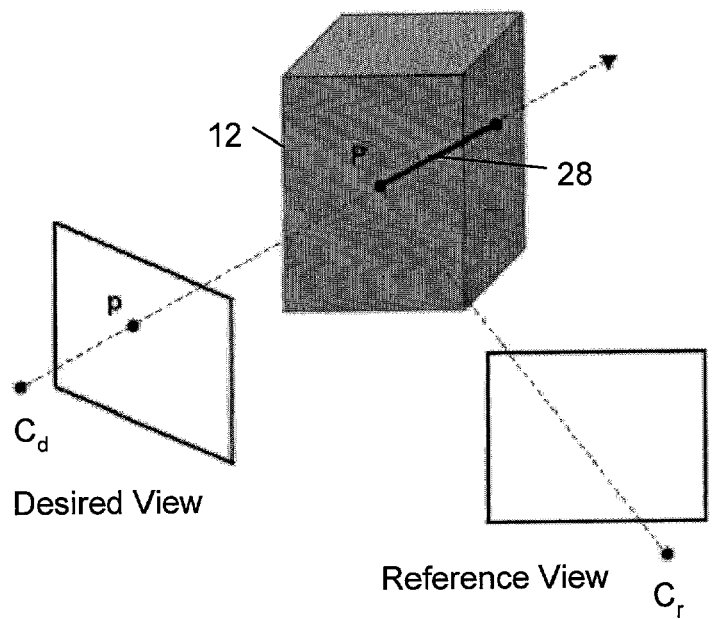
FIG. 3A is a diagrammatic representation of a point in 3D space that projects to a pixel in the desired view and is visible in the desired view.
Figure 3B:
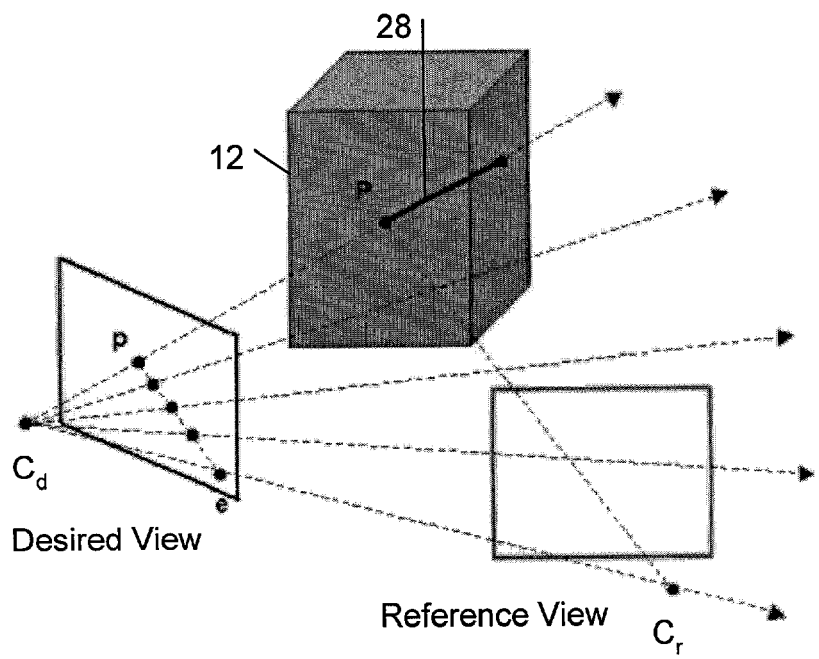
FIG. 3B is a diagrammatic representation of an epipolar line segment corresponding to a projection into the desired view of a reference view center of projection.
Figure 4:
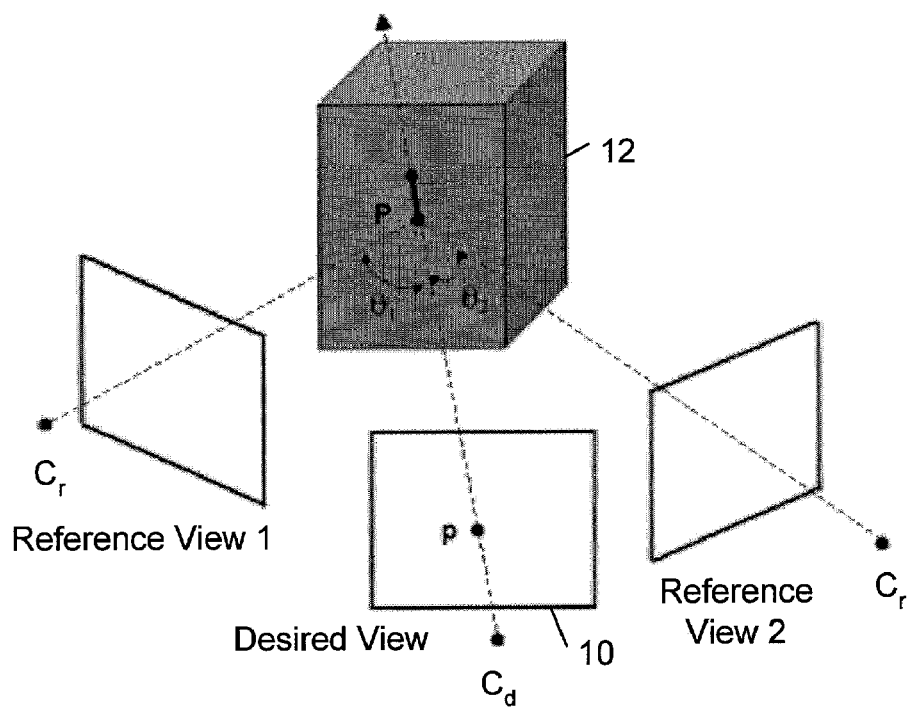
FIG. 4 is a diagrammatic representation of a view-dependent texture mapping.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

1 Introduction—Photo Hulls

The problem of reconstructing a 3D model of a scene using multiple 2D photographs is ill-posed. For a given set of 2D photographs, multiple 3D models that reproduce the photographs can and often do exist. A photo hull is the largest shape that contains all reconstructions in the equivalence class of 3D models that reproduce the photographs. The photo hull is unique and is relatively simple to compute. New, photo-realistic views of the scene can be synthesized by rendering the photo hull to virtual viewpoints.

A number of methods that compute photo hulls have been developed. These methods utilize photo-consistency as a constraint to identify scene surfaces. A point in space is said to be photo-consistent if (1) it does not project to background and (2) when visible, the light exiting the point (i.e. radiance) in the direction of each reference view is equal to the observed color in the photograph. For simplicity, one often assumes that the scene is Lambertian, although this isn't strictly necessary. Under this assumption, a point on a scene surface will project to a similar color in each reference view. The photo hull is then computed by finding the spatially largest set of points in 3D space that project to matching colors in the reference images.

These methods begin with a voxel space of initially opaque voxels that encompasses the scene to be reconstructed. As the methods run, opaque voxels are tested for photo-consistency and those that are found to be inconsistent are carved (i.e., made transparent). Convergence occurs when all the remaining opaque voxels are photo-consistent. When these final voxels are assigned the colors they project to in the input images, they form a model that closely resembles the scene. This model is the photo hull.

Our image-based photo hull (IBPH) method adopts a similar strategy to compute views of the photo hull. The method starts with a surface that is larger than the scene, and then iteratively carves space using a photo-consistency measure until the visible reconstructed points become photo-consistent. Some embodiments differ from previous photo hull reconstruction methods in that the method functions in image space and produces a view-dependent reconstruction. In some embodiments, a static 3D voxel space is not employed for reconstruction. Rather, in these embodiments, the reconstructed geometry is computed in a space defined by a virtual camera, and changes as the camera is moved about the scene. Rather than reconstruct the full photo hull geometry, these embodiments only reconstruct the portion of the photo hull that is visible to the virtual camera.

2 Image-Based Photo Hulls 2.1 Approach

The input to the illustrated embodiment described in detail below is a set of photographs taken with calibrated cameras. If the scene is static, this can be achieved using one camera that is moved about the scene. If the scene is dynamic, at each time instant, a photo is taken at each position using multiple cameras. Two or more viewpoints are used. Cameras can be placed arbitrarily relative to one another and objects in the scene.

A user specifies a virtual viewpoint that he/she would like to be synthesized. The IBPH method computes the 3D position of the scene surfaces visible to the virtual view, and then renders them to the display. The resultant image is a photo-realistic representation of what the scene would look like from the virtual camera position. This process is executed in an interactive fashion, producing an animation as the user moves the virtual camera about the scene.

Figure 6:
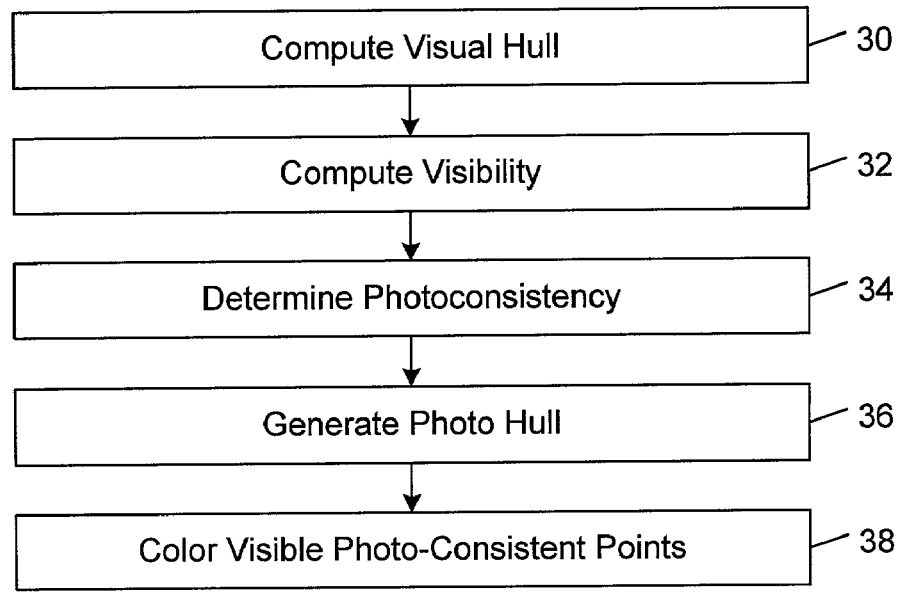
FIG. 6 is a flow diagram of a photo hull based method of generating a three-dimensional representation of a visual scene based upon a set of multi-view reference images.
Figure 7:
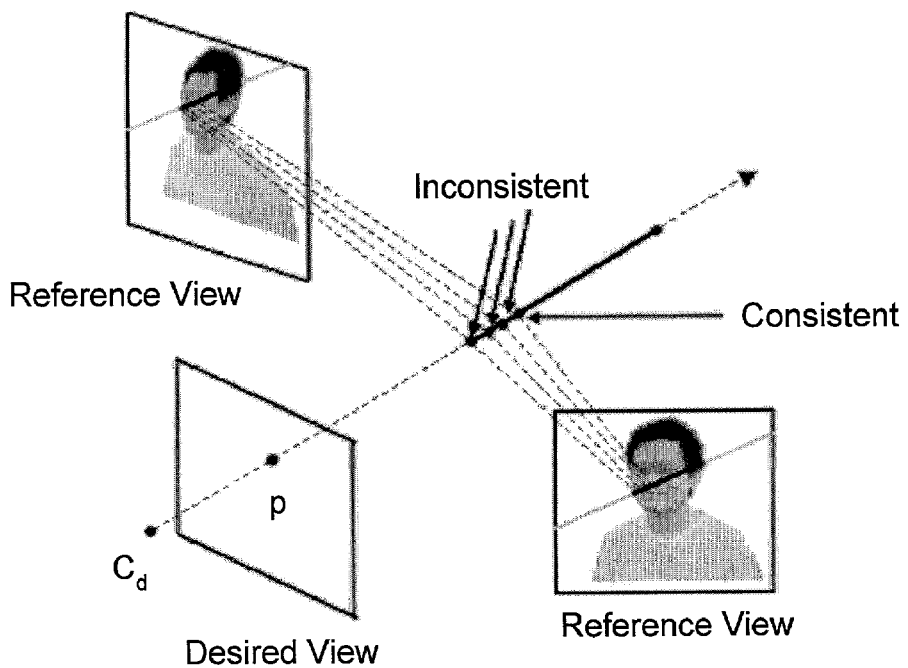
FIG. 7 is a diagrammatic representation of a method of computing an image based photo hull in accordance with the method of FIG. 1.

Referring to FIG. 6, in one embodiment, a three-dimensional representation of a visual scene may be generated based upon image-based photo hulls (IBPH) as follows. Our IBPH approach first computes the visual hull using the IBVH method, which quickly eliminates a large portion of 3D space that does not contain scene surfaces (step 30). Visibility of points on the computed visual hull with respect to each reference image is computed (step 32). In this embodiment, the photo-consistency of the closest point on the visual hull along each ray back-projected from the desired view is evaluated (step 34). If the point is inconsistent, we take a small step along the ray, moving away from the desired view, as depicted in FIG. 7. We continue stepping along an inconsistent ray until it either becomes consistent or we have stepped beyond all visual hull intervals along the ray. This latter case indicates that there is no photo-consistent geometry along the ray. The photo hull is generated (step 36) and visible photo-consistent points on the generated photo hull are colored (step 38).

Note that in this approach, only the points on the hull that are visible in the desired view are processed. These points are the first points in the first visual hull interval along each back-projected ray. The points farther along the ray are not visible and are not processed by our IBPH method.

2.2 Photo-Consistency

To determine the photo-consistency of a 3D point P along a ray, we project P into the $i^{th}$ reference view, yielding an image-space point $p_i$. We only perform this projection for the reference views that have visibility of P. Around each $p_i$ we collect a small neighborhood of pixels, $N_i$ to use in our color matching function.

There are many methods one can employ for matching color distributions to determine photo-consistency. In some embodiments, the standard deviation of all the pixels is thresholded. That is, consistency=True, if $\tau \leq T_1$; False otherwise (1)

where $\tau$ is the standard deviation of all pixels, $$\sum_i N_i,$$

and $T_1$ user-defined threshold. In the illustrated embodiment, we reconstruct the scene using RGB images, so a standard deviation is computed for each color channel and summed to produce $\tau$.

This measure of photo-consistency works reasonably well for many scenes. However, it can perform poorly for surfaces that project to consistent, yet highly varying colors in the reference images. This can occur on edges as well as textured surfaces. In such a case, each reference image will observe multiple different colors for the surface. Consequently, the standard deviation will be high, the photo-consistency measure can incorrectly return false.

Textured surfaces and edges will project to pixels with a high standard deviation in each image. In another embodiment, the consistency measure described above is modified to handle such surfaces. Let the standard deviation of a set of pixels $N_i$ from a reference view be $\sigma_i$. In this embodiment, the photo-consistency measure is given by equation (2):

consistency= True, if $\sigma \leq T_1 + \overline{\tau} T_2$; (2)

False otherwise where $\overline{\tau}$ is the average of $\tau_i$ and $T_2$ is a second user-defined threshold.

This consistency measure simply adds an additional term $\overline{\tau} T_2$ to the one defined in equation (1). This term spatially adapts the consistency measure based on the colors observed in the 3D point's projection. The value of $\overline{\tau}$ will be small when the 3D point projects to homogenous colors in each image. In this case, there will be little difference between the two consistency measures of equation (1) and equation (2). If these colors are similar, the point will be declared consistent. If these colors are dissimilar, the point will be declared inconsistent. When the point projects to highly varying pixels in each image, the $\overline{\tau}$ term will increase the maximum value of $\tau$ allowable for the point to be declared consistent. This allows for textured surfaces, as well as edges, to be correctly reconstructed. It also eases the Lambertian assumption. The threshold $T_2$ allows one to weight the contribution of this term to the photo-consistency measure.

This two-parameter consistency measure is the one used to produce photo hulls in the illustrated embodiment.

2.3 Stepping Along Epipolar Lines

As we step in 3D along an inconsistent ray, looking for the point at which it becomes consistent, we must simultaneously step along an epipolar line in each reference view. The brute-force way of stepping along the epipolar line in a reference view is to simply project each 3D point $P_i$ on the ray to the reference view point $p_i$ by multiplying the reference view's projection matrix H with $P_i$ (i.e., $p_i$=H $P_i$). Such an approach will work, but will require a large number of matrix multiplications.

While the step size |$\Delta P$| in 3D is constant, the step size between adjacent points along the epipolar line in a 2D reference view varies due to the projection. However, since the projection is a homography (linear projective transformation), the step size is constant in homogeneous coordinates. We use this fact to produce a more efficient procedure for stepping along the epipolar line.

Figure 8:
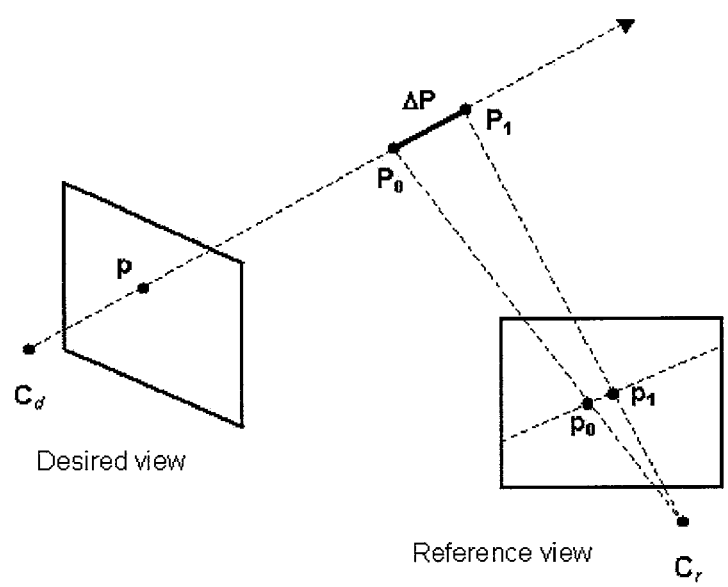
FIG. 8 is a diagrammatic representation of a method of stepping along an epipolar line.

Consider the 3D point $P_0$ on the ray, as shown in FIG. 8. It projects to a point $p_0$=H $P_0$ in a reference image. If we take a step along the ray, we arrive at a 3D point $P_1$=$P_0$+$\Delta P$. The point $p_1$, the projection of $P_1$ into the reference view can be written as $$p_1 = HP_1$$
$$= H(P_0 + \Delta P)$$
$$= p_0 + H\Delta P$$

Thus, we can incrementally update the homogeneous position of the point along the epipolar line in the reference view. That is, $$p_i = HP_0 \quad \text{if } i = 0 \quad (3)$$
$$= p_{i-1} + H\Delta P \quad \text{if } i > 0$$

We pre-compute H $\Delta P$ for each ray and store it in a look-up table. As we step along the epipolar line, we use equation (3) to compute the homogeneous position of the point $p_i$. With this approach, stepping along an epipolar line is very efficient.

2.4 IBPH Visibility

When evaluating the photo-consistency of a 3D point, only pixels from the reference views that have visibility of the 3D point should be used. As one steps along the inconsistent rays, the visibility of the scene may change. A point that was not visible in a reference view before may become visible after the step is taken. Therefore, it is necessary to update visibility after stepping. This is achieved by re-executing the visibility procedure described above.

In some embodiments, visibility is updated each time a step is taken along each ray. However, such an excessive number of visibility updates results in a slow reconstruction. In the illustrated embodiment, one step is taken along each inconsistent ray, and then visibility is updated. As a result, the visibility may be out-of-date when evaluating some 3D points. However, such an approach is conservative. Pixels from only a subset of the references views that have visibility of the point will contribute to the consistency measure. This may result in some 3D points being erroneously classified as consistent, while a full visibility calculation would show that they are really inconsistent. During the final iteration of our method, the visibility information is up-to-date. Since every ray is checked for photo-consistency on the final iteration, it follows that the final model is photo-consistent.

In some embodiments, speed is traded off for accuracy by not updating visibility at all. In these embodiment, when computing photo-consistency, one can use the visibility of the visual hull, which can be computed once after executing the IBVH method. Thus, visibility becomes out-of-date once a step has been taken along a ray. Using this inexact visibility will not yield the best reconstruction possible, but will be fast. In practice we have found that such an approach results in a slight degradation in quality for the data sets that we have tested, but runs approximately 25% faster.

2.5 Sampling

Figure 9:
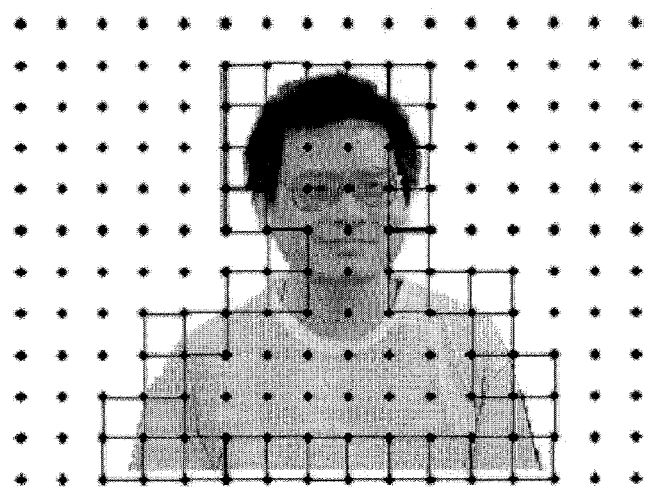
FIG. 9 is a diagrammatic view of a multi-resolution photo hull reconstruction of a visual scene.

Referring to FIG. 9, in some embodiments, reconstruction efficiency is improved by applying the IBPH method in a multi-resolution fashion. In these embodiments, the method is executed not for every pixel in the desired view, but rather on a coarse raster. One first computes the hull at sampling locations (x·DX, y·DY) in the desired image, where DX and DY are constants. These sampling locations are shown as black dots in FIG. 9. For in-between pixels on the boundary, indicated using black squares in the figure, the hull is computed at higher resolution. For pixels inside the boundary, the closest point of the visual hull interval is interpolated from adjacent samples. This approach significantly reduces the number of rays that must be processed, resulting in a faster reconstruction. In our application, typically DX and DY are both set to 4.

For IBPH, there is an additional sampling parameter, $\Delta P$. This is the size of the 3D step taken along an inconsistent ray. In our application, we set $|\Delta P|$ to a size of 2.5 mm, which for our camera configuration, results in a projected size $|\Delta p|$ of about 1 pixel for most reference views.

2.6 Convergence

In the illustrated embodiment, the IBPH method steps along the inconsistent rays, stopping at the point at which each ray becomes photo-consistent. For convergence, one can require that all rays are photo-consistent. However, often during a reconstruction, a significant majority of the rays will become consistent quickly. Continuing to process a handful of inconsistent rays will yield little impact on the overall quality of the reconstruction, but can take a lot of time. In the illustrated embodiment, we have introduced a mechanism to terminate the reconstruction when M or less rays are inconsistent. When M is a small number, good quality hulls are produced quickly.

Figure 10:
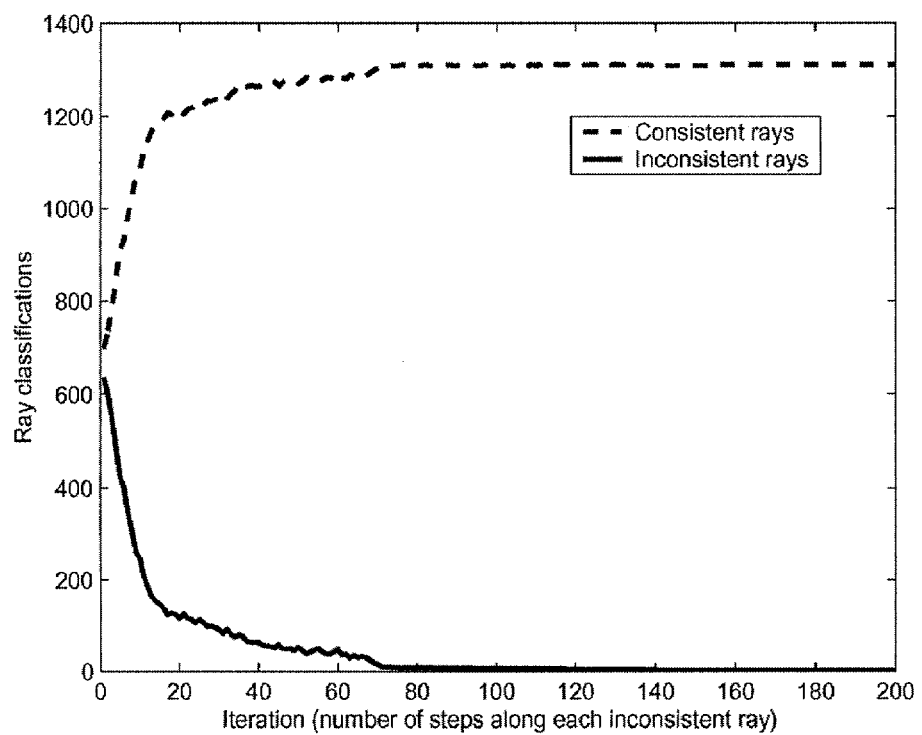
FIG. 10 is a graph of ray classifications plotted as a function of the number of steps taken along each inconsistent ray during a photo hull reconstruction of a visual scene.

FIG. 10 justifies our use of M to terminate the reconstruction before all rays are consistent. This plot shows ray classifications versus iteration for a synthetic view of our Sam data set. The visual hull projected to 1333 of the 80×60 points on the coarse raster. Rays back-projected through these points were analyzed using the IBPH method. Initially, 635 were inconsistent and 698 were consistent, as shown in the figure. At each iteration of the method, a step was taken along each inconsistent ray. The plot of the number of inconsistent rays is very steep at first, indicating that many rays become consistent quickly. After 60 iterations, most rays are consistent. However, it takes an additional 140 iterations for the few remaining inconsistent rays to become consistent. For real-time application, one would rather not continue processing these rays, as they will not significantly contribute to the quality of the reconstructed model.

2.7 Spatial Coherence

Most scenes exhibit a high degree of spatial coherence, as they consist of surfaces that do not radically change their position over a small region of space. Accordingly, many stereo vision methods impose a regularization criterion that requires the reconstructed geometry to be smooth. In a similar vein, we have developed a very simple and efficient smoothing technique that we incorporate into some embodiments of our IBPH method. The smoothing also helps mitigate reconstruction errors due to noise and specularities.

In these embodiments, when stepping along an inconsistent ray, we keep track of the number of steps we have taken, k. Before taking another step, we compare k to a local mean computed by averaging the number of steps taken along rays in a small neighborhood around the inconsistent ray. We denote this local average $\bar{k}$. If $k > \bar{k} + K$, where K is a small constant, we do not step along the ray. This ensures that the number of steps taken along a ray is not significantly different from that of its neighbors, resulting in a surface that is spatially coherent. This smoothing approach requires very little computation and works naturally with the representation of the hull geometry used in our method.

Figure 11A:
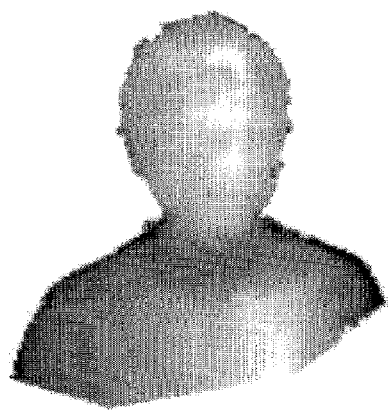
FIGS. 11A, 11B and 11C are depth maps corresponding to photo hull reconstructions of a visual scene generated with different smoothing parameters.

FIGS. 11A, 1 B and 11B illustrate the effect of changing K for a reconstruction of our Sam data set. Notice that there are less abrupt transitions in the depth map in the top-most reconstruction (K=1) compared to the bottom-most reconstruction (K=5).

2.8 Homogeneous Surfaces

Figure 11B:
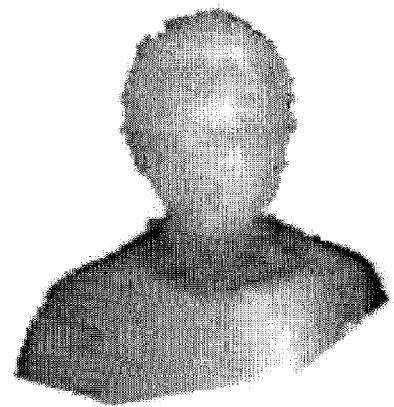
Figure 11C:

Surfaces that have a homogeneous color are difficult to properly reconstruct using color matching methods. A point in space near the surface will project to similar colors in the reference images. Such a point will be photo-consistent even though it is not actually on the surface being reconstructed. Our method is not immune to this problem, as is visible in any of the reconstructions of our Sam data set, such as those in FIGS. 11A–11C. These depth maps indicate some extra geometry jutting out of the person's chest, resulting from a homogeneously colored shirt the person was wearing. However, geometrical inaccuracies due to homogeneous surfaces are not significant once the model is texture-mapped. For example, the seams shown in the IBVH reconstructions of FIGS. 5A and 5B will not be present because the photo hull geometry will project to a homogeneous color in each reference view.

2.9 Pseudo-Code

The pseudo-code for one embodiment of the above-described IBPH method is presented below.

```
compute an image based photo hull
compute visibility
pre-compute homogeneous ray steps HΔP in each reference image
do
    evaluate photo-consistency
    for each inconsistent ray in desired view
        if (number of steps along ray ≤ k̄ + K)
            step along inconsistent ray
        else
            set ray consistent
        if (updating visibility)
            update visibility
} while (number of inconsistent rays > M)
display hull using view-dependent texture mapping
```

3 Results

Figure 5A:
FIGS. 5A and 5B represent a visual hull reconstruction of a person's head photographed from four viewpoints.
Figure 5B:
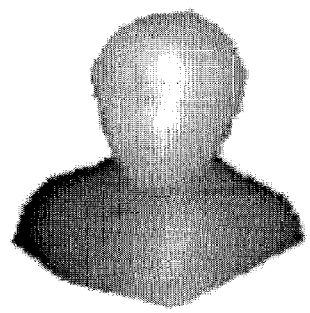
Figure 12A:
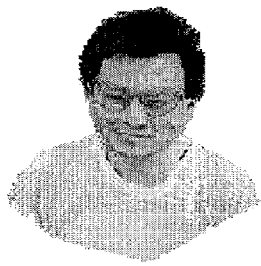
FIGS. 12A and 12B represent a photo hull reconstruction of a person's head photographed from four viewpoints.
Figure 12B:
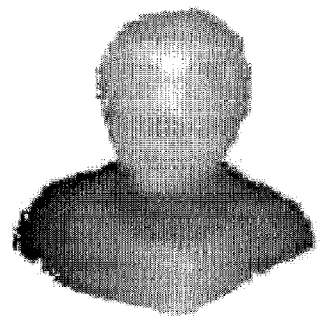

As shown in FIGS. 12A and 12B, the improved geometry of the photo hull corrects the problem of artifacts resulting from the inaccurate geometry of the visual hull (cf. FIGS. 5A and 5B). In FIGS. 12A and 12B, the person's head is reconstructed based upon photo hulls from the same view of the scene presented in the visual hull reconstruction of FIGS. 5A and 5B.

In another embodiment, we have implemented the IBPH method on a multi-camera system, similar to the one developed at MIT for the IBVH method. We have four calibrated Sony DFW-V500 digital cameras. The cameras are synchronized so that they take images of the scene at the same instant of time. Each camera is connected to an 800 MHz HP Kayak XM600 machine running Windows 2000. These machines perform background subtraction on the incoming frames, segmenting them into foreground and background regions. The resolution of the reference images is 320×240 pixels.

The segmented reference images are sent over a 100 Mb/s switch to our server machine, which computes the 3D reconstruction. Our server machine is a dual processor 2 GHz HP x4000 workstation running Windows 2000. Our method has been multi-threaded to take advantage of our multi-processor machine. The $i^{th}$ thread reconstructs the scene using a set of images corresponding to time $t_i$. In this way, the IBPH method can very naturally be parallelized.

Figure 13:
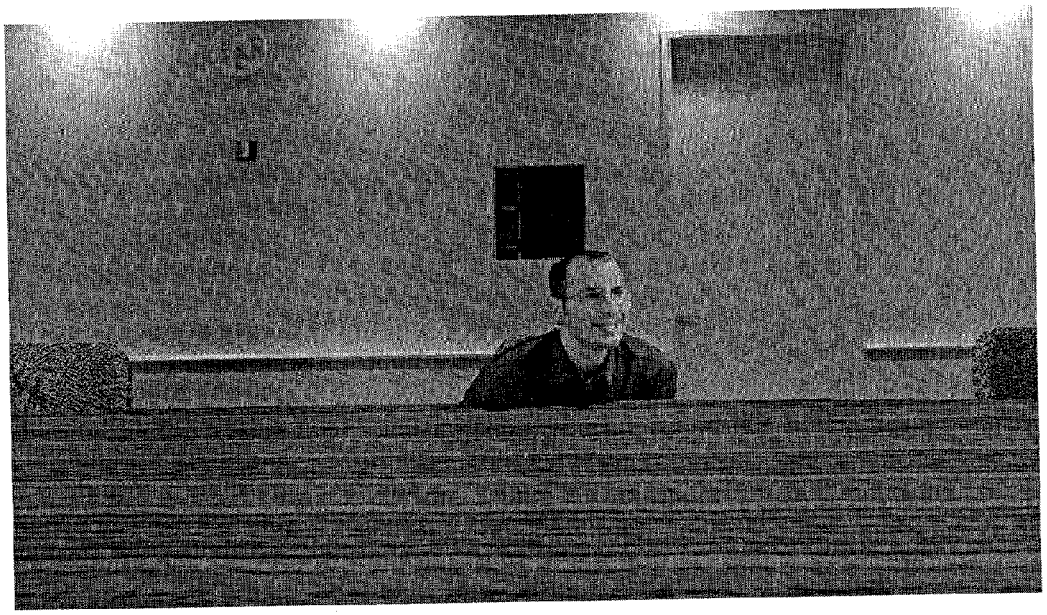
FIG. 13 is a diagrammatic view of an image-based photo hull reconstruction of a visual scene in a real-time 3D telepresence application.

FIG. 13 shows a view from a real-time 3D telepresence implementation of the above-described IBPH method. The 3D model of the person's head and upper body is reconstructed online using the IBPH method, but using pre-recorded data. For this example, the parameters used were DX=4, DY=4, M=60, K=2, and $|\Delta P|$=2.5 mm. The model of the person is then depth-composited with a 3D model of a conference room. New synthesized views of this composited scene are generated at 7.5 frames per second.

4 Conclusion

In sum, the above-described image-based photo hull embodiments efficiently reconstruct photo hulls. The more accurate geometry reconstructed in these embodiments results in better new views synthesized of the scene.

5 Other Embodiments

The above-described image-based photo hull embodiments may be used to process pre-recorded data and live data taken with a multi-camera system.

Other embodiments incorporate a photo-consistency measure that is different from the photo-consistency measure described above in that it properly reconstructs specular surfaces.

In some embodiments, the above-described photo-consistency measure is replaced with a photo-consistency measure that takes into account surface orientation or the distance of the reference view from the surface, or both. For example, a correlation-based matching photo-consistency measure may be used to improve reconstruction quality.

In some embodiments, the above-described embodiments may be modified to take into consideration temporal coherence. Motion constraints could be imposed to improve efficiency and reconstruction quality.

In addition, the above-described embodiments may incorporate an adaptive approach to determining $|\Delta P|$ (i.e., the step size taken along each ray might improve the efficiency of our method). For example, when the photo-consistency measure is very inconsistent, one might take larger steps. As the consistency improves, one could take smaller steps until the ray becomes photo-consistent.

In general, the above-described embodiments are not limited to any particular hardware or software configuration, but rather they may be implemented in any computing or processing environment, including in digital electronic circuitry or in computer hardware, firmware or software. In general, these embodiments may be implemented, in part, in a computer process product tangibly embodied in a machine-readable storage device for execution by a computer processor. In some embodiments, these embodiments preferably are implemented in a high level procedural or object oriented processing language; however, the methods may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

Other embodiments are within the scope of the claims.

What is claimed is:

1. A method of generating a three-dimensional representation of a visual scene based upon a set of multi-view reference images, comprising:

computing a visual hull containing the visual scene;

computing visibility of points on the computed visual hull with respect to each reference image;

determining photo-consistency of points on the computed visual hull along rays back-projected from a virtual view based upon reference images having visibility of the points;

generating a photo hull containing the visual scene by stepping along each back-projected ray; and coloring the photo-consistent points visible in the virtual view using color information contained in reference images having visibility of the photo-consistent points.

2. The method of claim 1, wherein computing a visual hull comprises determining a set of visual hull intervals for each of a set of rays back-projected from a center of projection of the virtual view.

3. The method of claim 1, wherein computing visibility for a reference image comprises determining whether the computed visual hull intersects line segments between a reference image center of projection and points on the visual hull projecting to points in the virtual view.

4. The method of claim 1, wherein generating the photo hull comprises terminating the stepping along a given back-projected ray when a photo-consistent point along the given back-projected ray is found.

5. The method of claim 1, wherein the photo hull is generated after a number of rays determined to be photo-consistent exceeds a threshold value.

6. The method of claim 1, wherein the steps are performed with respect to a sampled sub-set of pixels in the virtual view.

7. The method of claim 1, wherein coloring the photo hull comprises view-dependent texture mapping of the photo-consistent points using the reference images that have visibility of the photo-consistent points that are visible in the virtual view.

8. The method of claim 1, wherein the photo hull is generated only for the visual scene portion that is visible from the virtual view.

9. A method of generating a three-dimensional representation of a visual scene based upon a set of multi-view reference images, comprising:
computing a visual hull containing the visual scene;
computing visibility of points on the computed visual hull with respect to each reference image;
determining photo-consistency of points on the computed visual hull along rays back-projected from a desired view based upon reference images having visibility of the points, wherein determining photo-consistency comprises projecting 3D points to respective image-space points in the reference images having visibility of the projected points, and matching color distributions of sets of reference image pixels neighboring the respective image-space points;
generating a photo hull containing the visual scene by stepping along each back-projected ray; and
coloring the photo-consistent points visible in the desired view using color information contained in reference images having visibility of the photo-consistent points.

10. The method of claim 9, wherein determining photo-consistency comprises comparing a computed measure of color variability in the sets of reference image pixels against a threshold.

11. The method of claim 10, wherein the threshold comprises a non-variable parameter.

12. The method of claim 11, wherein the threshold further comprises a variable parameter that adapts to color variability in the sets of reference image pixels.

13. The method of claim 12, wherein the variable parameter comprises a measure of average color variability in the sets of reference image pixels.

14. The method of claim 9, wherein determining photo-consistency comprises stepping along an epipolar line in each reference view corresponding to a photo-inconsistent ray from a center of projection of the desired view through a point in the desired view.

15. The method of claim 14, wherein determining photo-consistency comprises projecting points along the ray to corresponding points in each reference image.

16. The method of claim 15, wherein projecting points comprises multiplying reference image projection matrices with points along the ray.

17. The method of claim 15, wherein projecting points comprises incrementally updating homogeneous positions of points along epipolar lines.

18. The method of claim 17, wherein point positions are incrementally updated based upon precomputed step sizes for each ray.

19. The method of claim 17, wherein point positions are incrementally updated based upon step sizes adaptively computed for each ray.

20. The method of claim 19, wherein step sizes are adaptively computed based upon a measure of photo-consistency of each ray.

21. The method of claim 14, further comprising re-computing visibility after stepping along an inconsistent ray.

22. The method of claim 21, wherein visibility is re-computed after a first step is taken along each photo-inconsistent ray.

23. The method of claim 14, wherein stepping along a photo-inconsistent ray is discontinued when the number of steps taken along the ray exceeds a measure of average steps taken along neighboring rays.

24. A computer program for generating a three-dimensional representation of a visual scene based upon a set of multi-view reference images, the computer program residing on a computer-readable medium and comprising computer-readable instructions for causing a computer to:
compute a visual hull containing the visual scene;
compute visibility of points on the computed visual hull with respect to each reference image;
determine photo-consistency of points on the computed visual hull along rays back-projected from a virtual view based upon reference images having visibility of the points;
generate a photo hull containing the visual scene by stepping along each back-projected ray; and
color the photo-consistent points visible in the virtual view using color information contained in reference images having visibility of the photo-consistent points.

25. The computer program of claim 24, wherein the computer program is operable to compute a visual hull by determining a set of visual hull intervals for each of a set of rays back-projected from a center of projection of the virtual desired view.

26. The computer program of claim 24, wherein the computer program is operable to compute visibility for a reference image by determining whether the computed visual hull intersects line segments between a reference image center of projection and points on the visual hull projecting to points in the virtual view.

27. The computer program of claim 24, wherein the computer program is operable to generate the photo hull by terminating the stepping along a given back-projected ray when a photo-consistent point along the given back-projected ray is found.

28. The computer program of claim 24, wherein the photo hull is generated after a number of rays determined to be photo-consistent exceeds a threshold value.

29. The computer program of claim 24, wherein the steps are performed with respect to a sampled sub-set of pixels in the virtual view.

30. The computer program of claim 24, wherein the computer program is operable to color the photo hull by view-dependent texture mapping of the photo-consistent points using the reference images that have visibility of the photo-consistent points that are visible in the virtual view.

31. A computer program for generating a three-dimensional representation of a visual scene based upon a set of multi-view reference images, the computer program residing on a computer-readable medium and comprising computer-readable instructions for causing a computer to:
compute a visual hull containing the visual scene;
compute visibility of points on the computed visual hull with respect to each reference image;
determine photo-consistency of points on the computed visual hull along rays back-projected from a desired view based upon reference images having visibility of the points, wherein the computer program is operable to determine photo-consistency by projecting 3D points to respective image-space points in the reference images having visibility of the projected points, and matching color distributions of sets of reference image pixels neighboring the respective image-space points;

generate a photo hull containing the visual scene by stepping along each back-projected ray; and color the photo-consistent points visible in the desired view using color information contained in reference images having visibility of the photo-consistent points.

32. The computer program of claim 31, wherein the computer program is operable to determine photo-consistency by comparing a computed measure of color variability in the sets of reference image pixels against a threshold.

33. The computer program of claim 32, wherein the threshold comprises a non-variable parameter.

34. The computer program of claim 33, wherein the threshold further comprises a variable parameter that adapts to color variability in the sets of reference image pixels.

35. The computer program of claim 34, wherein the variable parameter comprises a measure of average color variability in the sets of reference image pixels.

36. The computer program of claim 31, wherein the computer program is operable to determine photo-consistency by stepping along an epipolar line in each reference view corresponding to a photo-inconsistent ray from a center of projection of the desired view through a point in the desired view.

37. The computer program of claim 36, wherein the computer program is operable to determine photo-consistency by projecting points along the ray to corresponding points in each reference image.

38. The computer program of claim 37, wherein the computer program is operable to project points by multiplying reference image projection matrices with points along the ray.

39. The computer program of claim 37, wherein the computer program is operable to project points by incrementally updating homogeneous positions of points along epipolar lines.

40. The computer program of claim 39, wherein point positions are incrementally updated based upon precomputed step sizes for each ray.

41. The computer program of claim 39, wherein point positions are incrementally updated based upon step sizes adaptively computed for each ray.

42. The computer program of claim 41, wherein step sizes are adaptively computed based upon a measure of photo-consistency of each ray.

43. The computer program of claim 36, wherein the computer program is further operable to re-compute visibility after stepping along an inconsistent ray.

44. The computer program of claim 43, wherein visibility is re-computed after a first step is taken along each photo-inconsistent ray.

45. The computer program of claim 36, wherein the computer program is operable to discontinue stepping along a photo-inconsistent ray when the number of steps taken along the ray exceeds a measure of average steps taken along neighboring rays.

* * * * *